June 5, 1928.
J. E. SEEDERER
1,672,735
BEAM SCALE AND METHOD OF ADJUSTING
Filed March 23, 1928
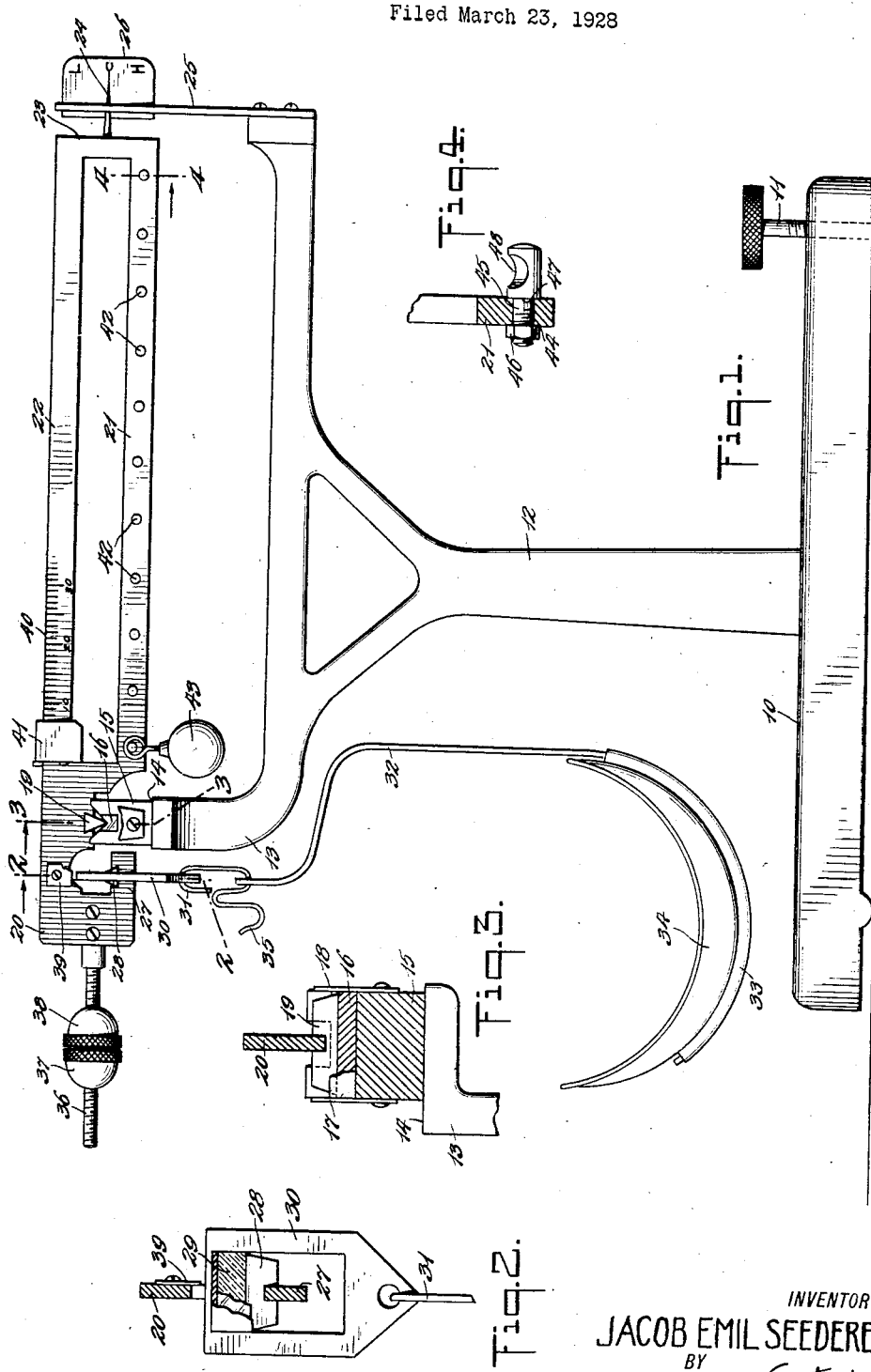
INVENTOR
JACOB EMIL SEEDERER.
BY
J.S.Wooster
ATTORNEY Patented June 5, 1928.

1,672,735

UNITED STATES PATENT OFFICE.

JACOB EMIL SEEDERER, OF JERSEY CITY, NEW JERSEY, ASSIGNOR TO SEEDERER-KOHLBUSCH, INC., OF JERSEY CITY, NEW JERSEY, A CORPORATION OF NEW JERSEY.

BEAM SCALE AND METHOD OF ADJUSTING.

Application filed March 23, 1928. Serial No. 264,005.

This invention relates to a beam scale and has for an object to provide a simple, efficient and accurate scale which can be economically manufactured and adjusted and will enable small quantities to be quickly and accurately measured.

In beam scales for weighing small quantities such as a thousandth of a pound, the beam is generally very light and must be very finely balanced. Under such circumstances, the alignment of the pivots and the variations in the distribution of the mass of the beam throughout its length must more carefully be considered than in a heavier beam. If a very light beam is provided with spaced notches to support a movable poise weight, the placing of the notches so that equal masses of the beam lie between them is practically impossible.

This invention concerns a light weighing beam having two weighing arms, on one of which are a plurality of graduations and a small sliding weight and on the other of which are a plurality of pivots at graduated distances apart preferably in decimal multiples of the small graduations on the first arm, each of said pivots being adapted to receive a poise weight. A load pan is supported on the side of the main pivot opposite the poise weight. If the capacity of the scale is one pound, the weight between poise pivots may represent tenths of a pound. In this case the total range of the sliding scale on the other arm would represent a tenth of a pound and this arm would preferably be graduated down to thousandths of a pound. Consequently very small weights can with precision be accurately determined and directly read.

The poise pivots are with approximate accuracy inserted on their arm but are adjustable in their mountings so that in calibrating, the pivot edges can be quickly and exactly adjusted so that the distance between the poise pivot edges can be made to compensate for variations in the mass of the beam therebetween. The line of the main and load pivot edges is designed to be substantially coincident with the longitudinal axis of the center of gravity of the beam. Preferably the poise pivots are provided with stems to fit into holes on the arm carrying them. These stems are provided with fastening means such as nuts so that after the pivots have been rotated to bring their edges to the proper point along the beam, the pivots can be securely fastened. This beam, therefore, can be quickly and accurately calibrated and is as symmetrically balanced as is possible and considerable time and labor is saved in the manufacture and adjustment of the scale.

A preferred form of the invention is illustrated in the drawings of which,

Fig. 1 is a side elevation of the scale;

Fig. 2 is a transverse section taken on the line 2—2 of Fig. 1;

Fig. 3 is a transverse section taken on the line 3—3 of Fig. 1;

Fig. 4 is a transverse section taken on the line 4—4 of Fig. 1.

In the drawings, the scale shown comprises a base 10, having a levelling screw 11 and a pedestal 12. At one end of the pedestal is an upright arm 13 having a flat upper surface 14 on which is mounted a brass casting 15 supporting a knife edge bearing 16, preferably of quartz. The retaining plates 17 and 18 are fastened to the casting 15 at opposite ends thereof extending above the quartz bearing 16 to act as retaining plates for a steel knife edge bearing 19. This steel knife edge bearing is mounted in the weighing beam 20 and is the main bearing for the scale. As shown in Fig. 1, the beam to the right of the main bearing is formed into a lower arm 21 and an upper arm 22. At the outer end these arms are joined by a cross piece 23 to which a suitable pointer 24 is fastened. This pointer is adapted to travel in a slot, not shown, in an upright plate 25 fastened to the end of the pedestal 12 opposite the upright 13. This plate 25 has an indicator plate 26 attached thereto with markings for high and low weight and neutral point.

To the left of the main pivot the weighing beam is formed with a downwardly and inwardly turned arm 27 on the upper surface of which is disposed a steel knife edge 28. This knife edge is adapted to engage with a quartz bearing member 29 mounted in a yoke member 30 to the lower end of which is connected a wire link 31 supporting the arm 32 which at its lower end is split into two arms such as 33, only one of which is shown, to support a pan 34. The link 31 is provided with a lateral extension hook 35 to support an additional weight.

At the left of the weighing beam is a threaded shaft 36 on which balance weights 37 and 38 are mounted. These weights act as lock nuts for each other. A guard plate 39 is adjustably fastened to the weighing beam above the top of yoke member 30 with its lower edge rather close to the top of the yoke member to keep it from coming off the knife edge 28.

The upper arm 22 of the weighing beam is provided with a scale 40, each of the graduations of which, for example will represent a thousandth of a pound. A sliding weight 41 moves along this arm. The lower arm 21 is provided with a plurality of adjustable knife edge bearing members 42 spaced a suitable distance apart and acting as supports for a weight 43. These adjustable bearings or pivots are spaced, for instance, a distance apart corresponding to a tenth of a pound. With the parts, as shown in Fig. 1, with both weigths 41 and 43 in their extreme left hand positions, the scale will balance with no weight in the pan.

Referring to Fig. 4 in which the detail construction of the knife edge pivots 42 is shown it will be apparent that at each point where a pivot is located the arm 21 is provided with a suitable aperture such as 44. The pivot member is provided with a threaded shaft 45 extending through said aperture and beyond same to receive a nut 45 which will tighten the pivot member in position. The main portion of the pivot member is larger in diameter than shaft 45 and consequently forms a shoulder 47 which bears against the front face of the arm 21. The main portion of the pivot member, as shown, is formed with a knife edge 48, which viewing the pivot from the side, as shown in Fig. 4, is also curved. In adjusting the pivots 42, for example, the weight 43 is hung on the first pivot, as shown, with the sliding weight 41 on its zero mark and if the knife edge of that particular pivot is in the correct position the scale will balance with the pointer 24 on zero. If the scale does not balance, the nut on the back of the pivot is loosened slightly so that the pivot can be turned on its axis ever so slightly in one direction or another until it is in the right position to balance, whereupon the nut is tightened and then the pivot is thus easily and quickly disposed with its knife edge in exactly the right place. The weight 43 is then placed on the next pivot to the right, which in accordance with the scale indicated above, would represent a weight of a tenth of a pound. A standard weight in this amount is placed in the pan and if the knife edge of the pivot on which the weight 43 is hung is in the correct position the scale will balance. Otherwise the same procedure is adopted to adjust the knife edge as before. This procedure is followed for each pivot throughout the length of the lower arm and consequently provides a simple, efficient and speedy method whereby the points of support for the weight 43 can be very quickly and accurately adjusted.

It will be noticed that the beam is light in weight and that by reversely curving the left hand end of the beam, the knife edge pivot for the scale pan can be brought close to the main pivot. Furthermore the axis of the shaft 36 for the balance weights 37 and 38 are in line with the knife edges 28 and 19. This line is designed to coincide as far as possible with the longitudinal axis of the center of gravity of the beam thus insuring a finer balance.

This scale, therefore, can be calibrated in terms of pounds and small fractions of a pound to read the weight direct in decimals and is particularly adapted to weighing sample materials. Only one sliding weight is used and one poise weight. The full scale movement of the sliding weight represents the same difference in weight as would occur by advancing the poise weight one pivot. In other words, in accordance with the scale described, the weight between the pivots is a hundredth of a pound and the full scale movement of the weight 41 represents a tenth of a pound divided up into one hundred parts, each graduation being a thousandth of a pound.

It is to be understood that when I use the term "knife edge pivot", I intend this term to include not only the knife edge member itself but its cooperating socket or receiving member.

I claim:

1. A scale comprising a weighing beam having unequal longitudinal mass distribution, and a plurality of adjustable knife edge pivots on said beam each adapted to support an auxiliary weight, disposed with regard to said distribution.

2. A scale comprising a weighing beam having an upper and a lower weighing bar; a plurality of adjustable knife edge pivots on one bar located externally of the main pivot of the beam and a movable weight on the other bar.

3. A scale comprising a weighing beam having unequal longitudinal mass distribution and a plurality of pivot apertures therein, knife edge pivots adjustably disposed in said apertures, each of said pivots adapted to support a weight and means to fasten the pivots in their adjusted positions in said apertures with regard to said distribution.

4. A scale comprising a weighing beam having an upper and lower weighing bar, a plurality of adjustable knife edge pivots on the lower bar located externally of the main pivot of the beam and a movable weight on the upper bar.

5. A scale comprising a weighing beam having a main knife edge pivot, a load knife edge pivot and a tare weight shaft on one side of said main pivot, and a pointer on the other side of the main pivot, the axis of said shaft, the edges of said pivots and the axis of the pointer being disposed substantially along the longitudinal axis of the center of gravity of the beam.

6. A scale comprising a weighing beam having a main pivot, the beam on one side of said pivot being turned downwardly and inwardly toward the main pivot and a load pivot disposed on the inwardly turned portion.

7. A supporting link for scales comprising a loop portion from which an article can be supported and an offset hook portion adapted to act as an auxiliary support.

8. In a scale the combination with a weighing beam having an aperture therein, of a knife edge pivot having a stem extending through said aperture, a shoulder on the main portion of the pivot member to bear against the face of the beam and means on the end of the stem for tightening the pivot on the beam in an adjusted position.

9. In a scale the combination with a weighing beam having an aperture therein, of a knife edge pivot having a threaded stem extending through said aperture, a shoulder on the main portion of the pivot member to bear against the face of the beam and a nut on the stem for tightening the pivot on the beam in an adjusted position.

10. A scale comprising a flat bar beam having a supporting means adjacent one end, a load carrying means on one side thereof, and a plurality of unit graduated balance weight supporting portions on the other side disposed vertically one over the other in determined relation to said supporting and load carrying means, a unit graduation on one portion being a multiple of a unit graduation on the other portion, an adjustable knife edge pivot for each of the large units extending laterally of the bar, and movable balance weights for the respective portions.

Signed at Jersey City in the county of Hudson and State of New Jersey, this 20th day of March A. D. 1928.

JACOB EMIL SEEDERER.